United States Patent

[11] 3,536,229

| [72] | Inventor | Yedidya Boros |
| | | 15 Pinsker, Rishon Le Zion, Israel |
| [21] | Appl. No. | 750,053 |
| [22] | Filed | Aug. 5, 1968 |
| [45] | Patented | Oct. 27, 1970 |

[54] ACCELERATOR AND BRAKE CONTROL MECHANISM FOR VEHICLES
9 Claims, 11 Drawing Figs.

[52] U.S. Cl. ................................................. 192/3,
74/478, 74/513, 74/514, 74/535
[51] Int. Cl. ....................................................... F16d 67/00
[50] Field of Search............................................ 192/3,
3(T); 74/478

[56] References Cited
UNITED STATES PATENTS

| 2,024,055 | 12/1935 | Moore | 192/3 |
| 2,483,224 | 9/1949 | Marcorich | 192/3X |
| 2,536,854 | 1/1951 | Parker | 192/3 |
| 2,568,454 | 9/1951 | Laverents | 192/3(T)UX |
| 2,831,367 | 4/1958 | Reilly | 192/3(T)UX |
| 2,878,908 | 3/1959 | Winkelman | 192/3 |

*Primary Examiner*—Benjamin W. Wyche, III
*Attorney*—Benjamin J. Barish

ABSTRACT: An accelerator and brake control mechanism for vehicles is described comprising a pivotably mounted foot pedal including mechanism for controlling the vehicle accelerator upon pivoting the foot pedal in one direction and for controlling the vehicle brakes upon pivoting it in the other direction, and a retaining device for retaining the foot pedal in one of the other pivoted positions and for fixing the accelerator or brakes in a predetermined condition.

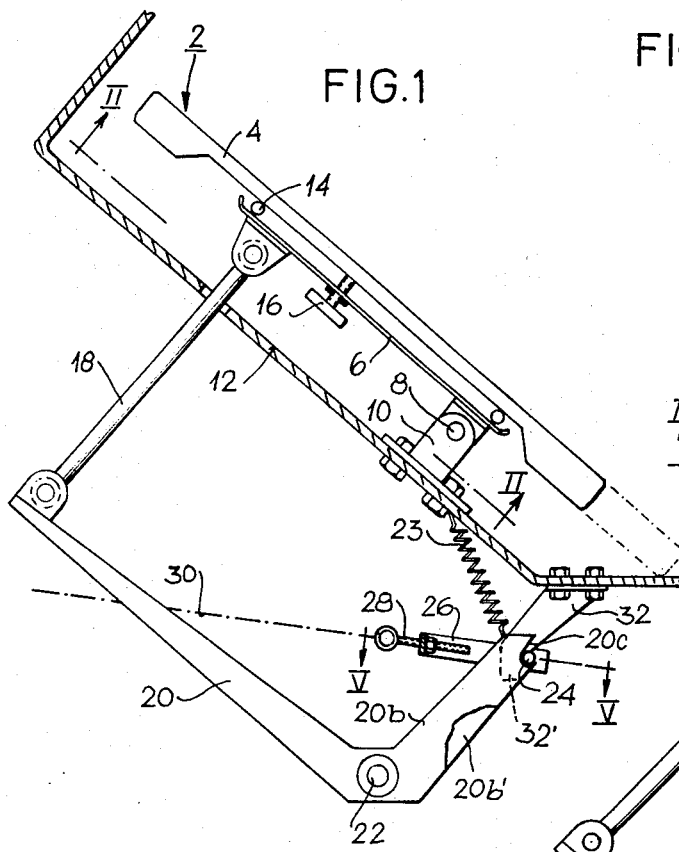
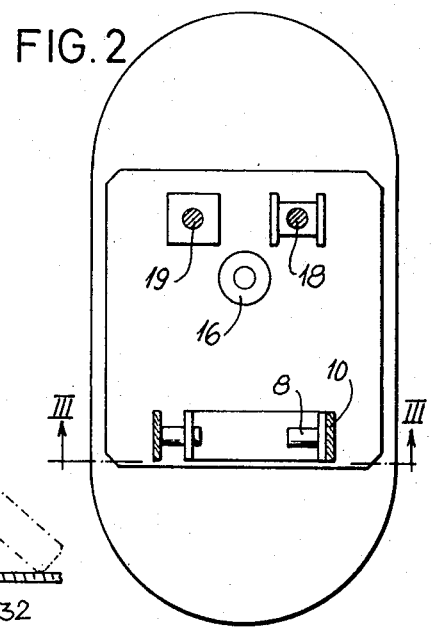
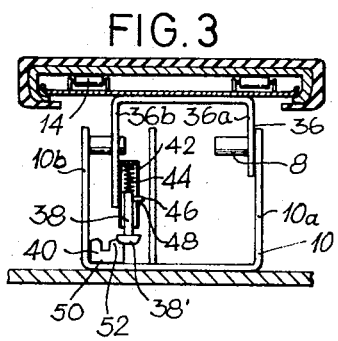
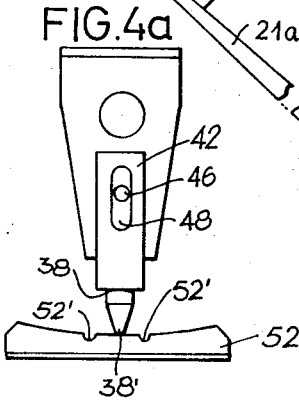
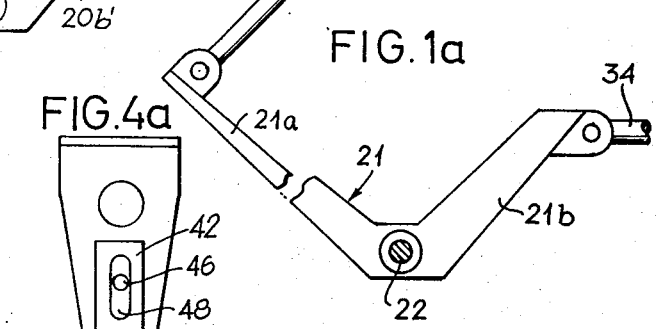
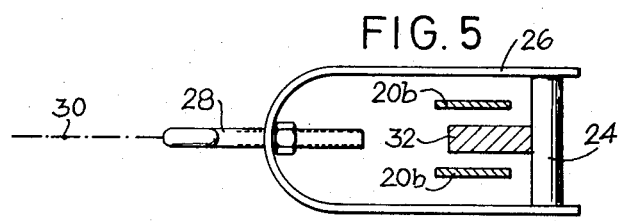
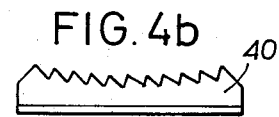
INVENTOR
YEDIDYA BOROS

INVENTOR
YEDIDYA BOROS

BY
ATTORNEY

ACCELERATOR AND BRAKE CONTROL MECHANISM FOR VEHICLES

BACKGROUND OF THE INVENTION

1. Field of the Invention

The present invention relates to accelerator and brake control mechanisms for vehicles, and particularly to such mechanisms including a foot pedal which may be pivoted in one direction for operating the accelerator and in the opposite direction for operating the brakes.

2. Description of the Prior Art

A number of such accelerator and brake control mechanism have already been proposed for vehicles. Apparently, however, they have not answered the needs of the public as they have not yet come into widespread use.

The present invention aims to provide an accelerator and brake control mechanism which can also perform additional functions thereby enhancing the usefulness of such mechanism.

SUMMARY OF THE PRESENT INVENTION

The present invention provides an accelerator and brake control mechanism for vehicles comprising a pivotably mounted foot pedal having means for controlling the vehicle accelerator upon pivoting the foot pedal in one direction, means for controlling the vehicle brakes upon pivoting the foot pedal in the other direction, and a retaining device for retaining the foot pedal in one or the other pivoted position for fixing the accelerator or brakes, respectively, in a predetermined condition.

With the foregoing control mechanism, the foot pedal may thus be used not only for operating the accelerator and brakes, but may also be used for fixing the brakes in braking position (e.g. instead of the hand brakes) and for fixing the accelerator in a predetermined position so that the vehicle travels at a fixed predetermined speed.

In the two embodiments described below, the retaining device comprises a fixed stepped element and a retaining pin movable with the foot pedal, the retaining pin being receivable in a step of the stepped element for fixing the position of the foot pedal, and thereby the condition of the accelerator or brakes.

According to a further feature, the mechanism further includes a detent device which provides an indication, i.e. a "click", to the operator when the foot pedal is moved past "zero" to actuate the accelerator or brakes.

In one embodiment of the invention described below, the foot pedal is additionally mounted for slidable movement in a lateral direction with respect to its pivot point, the movable retaining pin being receivable in a step of the fixed stepped element upon sliding the foot pedal in the lateral direction. In another described embodiment, the foot pedal is additionally mounted, besides the above-mentioned pivotable mounting, for downward pivotable movement about an axis parallel to the longitudinal axis of the foot pedal. In the latter arrangement the foot pedal is downwardly pivoted about the latter axis by the downward force of the user's foot to cause the retaining pin to disengage from the stepped element, and is upwardly pivoted by a spring when the downward force of the user's foot is removed to cause the retaining pin to engage the stepped element.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 1 is a side view illustrating one form of accelerator and brake control mechanism constructed in accordance with the invention; FIG. 1a illustrates elements of FIG. 1 with parts removed; FIG. 2 is a sectional view along lines II–II of FIG. 1; FIG. 3 is a sectional view along lines III–III of FIG. 2; FIGS. 4a and 4b illustrate details of the mechanism of FIG. 1, and FIG. 5 is a sectional view along lines V–V of FIG. 1.

DESCRIPTION OF THE EMBODIMENT OF FIGS. 1—5

Figure 6:
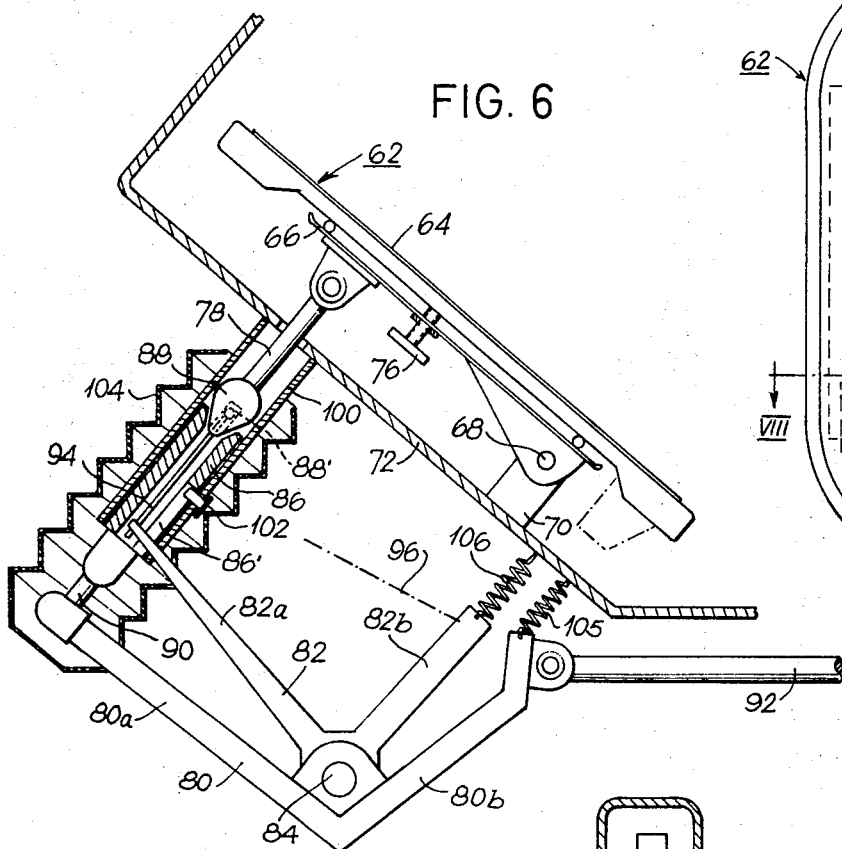
FIG. 6 is side view illustrating another control mechanism constructed in accordance with the invention.
Figure 7:
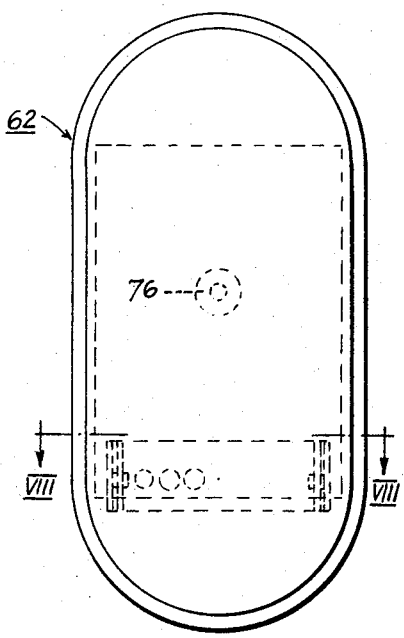
FIG. 7 is a top plan view thereof.

With reference to FIG. 1, there is shown a vehicle foot pedal, generally designated 2, including a foot pad 4 mounted on a pedal support 6, the latter being pivotably mounted on axle 8 carried by a U-shaped supporting member 10 (see FIG. 3) fixed to the vehicle floor 12. Foot pad 4 is slidable on the foot pedal support 6 in the direction of the longitudinal axis of the foot pedal. For this purpose, roller bearings 14 are interposed between foot pad 4 and the foot pedal support 6, the position of the foot pad being fixed, if desired, by a screw 16 passing through support 6 and engageable with the underside of the foot pad. Foot pedal 2 is pivotable on axle 8 (i.e., on an axis extending transversely of the foot pedal) in one direction (clockwise, FIG. 1) to assume any one of a plurality of positions for controlling the accelerator in accordance with the position assumed, and is also pivotable in the opposite direction (counterclockwise, FIG. 1) for controlling the brakes.

A pair of parallel links 18 and 19 (FIGS. 1a and 2) are pivotably mounted at their upper ends to foot pedal 2 and pass through the vehicle floor 12. The opposite ends of links 18 and 19 are pivotably mounted respectively to one arm 20a and 21a of two parallel bellcranks 20 and 21 pivotably mounted on a horizontal axle 22. The opposite end of bellcrank 20 includes two parallel arms 20b and 20b' coupled to actuate the accelerator mechanism when the bellcrank is pivoted in one direction and the opposite end of bellcrank 21 includes an arm 21b coupled to actuate the brake mechanism when the bellcrank is pivoted in the opposite direction. Spring means, e.g. 23, maintain the bellcranks in "zero" or normal position. The foregoing elements serve as coupling mechanisms connecting the foot pedal to the accelerator and to the brakes for controlling them in accordance with the direction of pivoting the foot pedal and the position assumed by the pivoted foot pedal.

For actuating the accelerator, the outer extremities of arms 20b and 20b' of bellcrank 20 are notched, as shown at 20c, and in the notch there is received a pin 24 connected across the ends of a bail 26 (see also FIG. 5). The opposite end of the bail carries a cable clamp 28 for a cable 30 connected to the accelerator control mechanism. Pin 24 and bail 26 are supported in normal position by a bracket 32 depending from the vehicle floor 12 and having a hooked end 32' receiving pin 24. When foot pedal 2 is pivoted in a clockwise direction, by the operator pressing down on the heel (lower) portion of the foot pad 4, bellcrank 20 is caused to pivot in a clockwise direction by link 18, whereupon arms 20b and 20b' of the bellcrank move pin 24 rightwardly, thereby pulling cable 30 to actuate the accelerator in accordance with the amount of displacement of the foot pedal.

For operating the brakes, the operator presses down on the upper, or sole portion of the foot pad 4, moving the foot pedal counterclockwise, thereby pivoting the bellcrank 21 (FIG. 1a) counterclockwise. Arm 21b of the bellcrank pivotably mounts at its upper end a link 34 which actuates the braking mechanism of the vehicle.

It will be seen that whereas both bellcranks are moved by the foot pedal, only one will actuate its respective mechanism, depending upon the direction of movement of the foot pedal.

According to the invention, a retaining device is provided for retaining the foot pedal in one or the other pivoted position for fixing the accelerator or brakes in a predetermined condition. In the embodiment of FIGS. 1—5, foot pedal 2 is mounted for slidable movement in a lateral direction with respect to its pivotal axis 8, the movement of the foot pedal in this direction operating the retaining device. For this purpose, the foot pedal support 6 carries an inverted U-shaped member 36, the two legs of which are formed with aligned openings through which pass axle 8. One leg 36a of the inverted U-shaped member 36 is normally located adjacent to one leg 10a of supporting member 10, but the other leg 36b of member 36 is spaced away from the corresponding leg 10b of member 10. This permits the foot pedal to slide laterally on axle 8, leftwardly in the view of FIG. 3.

Leg 36b of member 36 carries a retaining pin 38 adapted to cooperate with a fixed curved, stepped element 40 when the foot pedal is moved laterally to retaining position. Retaining pin 38 is carried in a housing 42 and is spring-biased downwardly by a spring 44. The downward movement of the pin is guided by a stud 46 fixed to the pin and movable along a slot 48 formed in the wall of housing 42. The lower end 38' of the pin is enlarged in width but reduced in thickness so as to form a rounded thin edge.

Stepped element 40, formed with a plurality of teeth cooperable with retaining pin 38 to fix the position of the foot pedal, is actually one upwardly-directed leg of a curved, channel-shaped member 50. The other upwardly-directed leg 52 of channel member 50 is formed at its upper edge with a pair of notches or detents 52' (FIG. 4a) one on each side of the "-zero" position of the foot pedal. This leg is cooperable with retaining pin 38 in the normal (nonlocking) use of the foot pedal to provide a "click" when the foot pedal is moved past its "zero" position for actuating the brakes or accelerator. Thus the movement of the foot pedal to braking or accelerating position is felt by the operator.

The operation of the control device will be apparent from the foregoing description. In order to accelerate the vehicle, the operator need only press downwardly on the lower (heel) portion of the foot pedal 2, which pivots bellcrank 20 clockwise, causing arms 20b and 20b' to pull on cable 30 to actuate the vehicle accelerator. To brake the vehicle, the operator presses downwardly on the upper (sole) portion of the foot pedal, which pivots bellcrank 21 (FIG. 1a) counterclockwise, causing its arm 21b to pull on link 34 to actuate the vehicle braking mechanism.

The movement of the foot pedal past "zero" to either its accelerating or braking position is indicated to the operator by a "click" produced as retaining pin 38 passes a detent 52' of element 52.

To lock the foot pedal in its pivoted position, the operator need only move the foot pedal 2 laterally. Leg 36b of member 36, carried at the lower side of the foot pedal, is thus moved sideways and carries with it the retaining pin 38. The latter overrides detent element 52, against the action of spring 44, and moves between a pair of teeth of stepped element 40 at one or the other end thereof, depending upon the direction of pivoting the foot pedal, thus retaining the foot pedal in its pivoted position.

In this manner, the foot pedal can be retained in braking position, or it can be retained in gas-feeding position to fix the speed of the vehicle. To release the retaining device, the operator moves foot pedal laterally in the opposite direction (rightwardly in FIG. 3), whereupon retaining pin 38 disengages from stepped element 40, overrides detent element 52, and returns to its normal position as illustrated in FIG. 3.

If desired, foot pad 4 may be raised or lowered on rollers 14 to suit the comfort of the driver, and then locked in position by screw 12. Also, if the driver is a woman, the lower (heel) part of this foot pedal may be formed with a depression or socket for reception of the shoe heel.

DESCRIPTION OF THE EMBODIMENT OF FIGS. 6—9.

A second embodiment of the invention is illustrated in FIGS. 6—9. With reference to FIG. 6, there is shown a vehicle foot pedal 62 including a foot pad 64 mounted on a pedal support 66, the latter being pivotably mounted on an axle 68 carried by a U-shaped supporting member 70 fixed to the vehicle floor 72, substantially as described in FIG. 1. In FIG. 6, foot pad 64 is also slideable on the foot pedal support 66, its position being fixed, if desired, by a screw 76.

A single link 78 is pivotably mounted to foot pedal 62 and passes through the vehicle floor 72 where it is attached to the coupling mechanisms for operating the accelerator and brake control devices. The latter coupling mechanisms, in the embodiment of FIGS. 6—9, comprise a pair of bellcranks 80 and 82, each pivotably mounted on an axle 84.

Bellcrank 80 is used for operating the brake control mechanism and comprises a sleeve 86 coupled to link 78 by means of a block 88 carried at the lower end of the link, the lower end of the block being reduced in thickness and received in the upper, chamfered end of the sleeve. A rod 90 is pivotably mounted to the lower end of sleeve 88, and the opposite end of the rod is pivotably mounted to arm 80a of bellcrank 80. The latter bellcrank also includes a second arm 80b to which is pivotably coupled a link 92 of the brake control mechanism. To apply the brake, the operator presses downwardly on the upper, or sole, part of the foot pedal, causing link 78 to move downwardly, which in turn causes bellcrank 80 to pivot counterclockwise, whereby link 92 is pulled leftwardly to operate the brakes.

Bellcrank 82 is used for operating the accelerator control mechanism. For this purpose, this bellcrank includes an arm 82a coupled to link 78 by means of a flexible cable 94 fixed within a slot 88' of block 88. The second arm 82b of bell crank 82 is coupled to the accelerator control mechanism schematically shown at 96 in FIG. 6. To operate the accelerator, the user presses down on the lower, or heel, portion of the foot pedal, causing the latter to pivot clockwise, and thereby also causing the bellcrank 82 to pivot clockwise, mechanism 96 being thereby moved rightwardly to feed more gas to the vehicle carburetor.

It will be seen that when operating the brake by pressing down on the upper part of the foot pedal, accelerator bellcrank 82 will not be affected by virtue of the flexible cable 94 coupling between the latter and line 78. When operating the accelerator, by pressing down on the lower part of the foot pedal, the brakes are not affected because arm 82a of bellcrank 82 passes through a slot 86' in sleeve 86 which permits the latter arm to move upwardly by the foot pedal within the sleeve. Sleeve 86 is disposed within a cylindrical housing 100 having a screw 102 passing through one wall and projecting into slot 86' so as to constrain the movement of sleeve 86, when operating the brakes, to a rectilinear path. The latter sleeve, as well as the connections to arms 80a and 82a, maybe enclosed within a dirt-protecting bellows-type covering 104.

A spring schematically shown at 105 retains bellcrank 80 in its normal, nonbraking position, and another spring schematically shown at 106 retains bellcrank 82 in its normal, nonaccelerating position.

The embodiments of FIGS. 6—9 also includes means for locking the foot pedal in its pivoted position so as to fix the brakes or accelerator, as in the embodiment of FIGS. 1—5.

Figure 8:
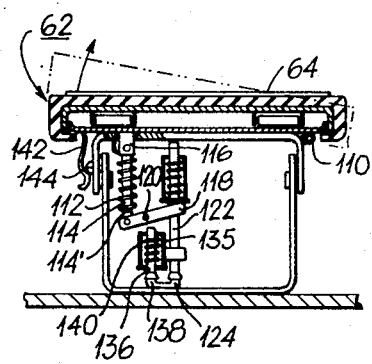
FIG. 8 is a sectional view along lines VIII–VIII of FIG. 7.
Figure 9:
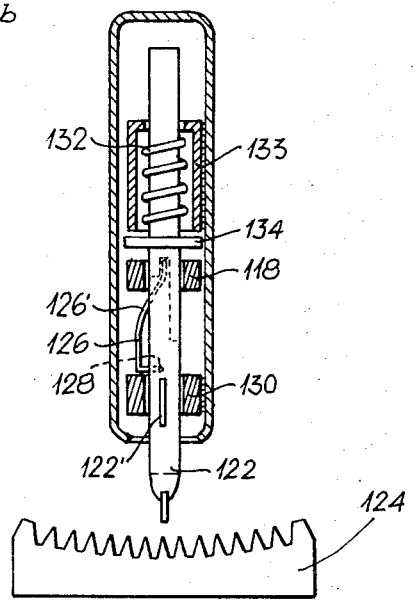
FIG. 9 is an enlarged view illustrating detail of parts of the mechanism of FIG. 6.

As best seen in FIGS. 8 and 9, the foot pad 64 of the foot pedal is pivoted on hinge pin 110 which extends along one edge of the pedal parallel to its longitudinal axis. The foot pad is normally urged to its upper position, shown in broken lines in FIG. 8, by a spring 112 and is moved to its lower position, shown in full lines, by the pressure of the user's foot whenever the user operates the accelerator or brakes. A link 114 is mounted to a pair of ears 116 carried on the undersurface of foot pad 64 and is depressed with the latter against the action of spring 112.

That is to say, spring 112 is a tension spring, the upper end of which is attached to a fixed part of the foot pedal 62, the lower end of the spring being attached to a pin 114' on link 114. The lower end of link 114 is coupled to one end of a pair of arms 118 both pivotally mounted at 120, the opposite ends of arms 118 straddling a retaining pin 122. The latter pin is adapted to cooperate with a stepped element 124 for retaining the foot pedal in its pivoted position in order to fix the position of the accelerator or brakes, as in the case of the embodiment of FIGS. 1—5.

The retaining pin 122 is shown in FIGS. 9 in its upper, nonengaging position. It assumes this position when the foot pad 64 is pressed downwardly by the user's foot, i.e. when the user is operating the foot pedal for either accelerating or braking. As soon as the user removes his foot from the foot pedal, the foot pad 64 moves to the upper, broken line position, illustrated in FIG. 8, with link 114, under the action of tension spring 112. This causes the pair of arms 118 to pivot clockwise, i.e. downwardly in the view of FIG. 9. Retaining pin 122 carries a spring 126 one end of which spring is attached to the retaining pin and the opposite end of which is turned inwardly and seats within a bore 128 in the pin. The midportion of spring 126 is bowed outwardly and includes a cam surface 126' engageable by arms 118, when the latter move downwardly, to flex the spring inwardly causing its lower end to move within bore 128. A spring 132 disposed within a sleeve 133 bears against an annular disc 134 formed on retaining pin 122 to urge the latter downwardly. In the normal or nonflexed, bowed condition of the spring, its lower ends limits against a stop 130 to prevent retaining pin 122 from moving downwardly under the action of spring 132. However, when arms 118 are moved downwardly against the cam portion 126' of spring 126, the latter spring is flexed inwardly clearing stop 130, permitting spring 132 to move the retaining pin 122 downwardly into engagement with stepped element 124.

In other words, when the operator does not have his foot on foot pad 64, the latter assumes the upper, broken line position illustrated in FIG. 8, causing link 114 to be moved upwardly, and arms 118 to be pivoted (clockwise in FIG. 8, and downwardly in FIG. 9), moving spring 126 inwardly past stop 130, whereby spring 132 moves retaining pin 122 downwardly into engagement with the stepped element 124. Thus, the foot pedal is locked in whatever position to which it had been pivoted, either the braking or accelerating position.

When the operator presses down on the foot pedal either for braking or accelerating as described above, foot pad 64 is thereby pivoted downwardly to the full line position illustrated in FIG. 8. This causes link 114 to move downwardly, and arms 118 to pivot counterclockwise. Thus, the arms 118 are raised (when viewed in FIG. 9), causing them to engage disc 134 carried by retaining pin 122, thereby effecting the raising of the retaining pin and its disengagement from stepped element 124.

The embodiment of FIGS. 5—9 also includes a detent device operable by the foot pedal for indicating to the operator when the foot pedal is pivoted past its "zero" position, either to brake or to accelerate the vehicle. For this purpose, retaining pin 122 carries sleeve 135 (FIG. 8) in which is disposed the upper end of a detent pin 136. The lower end of the latter pin cooperates with a curved element 138 (similar to element 52 in FIGS. 1—5) for providing a "click" when the foot pedal is pivoted past its "zero" position. Detent pin 136 is normally urged downwardly into engagement with element 138 by a spring 140 disposed within sleeve 134.

Further, a latch 142 is provided on foot pad 64 engageable with a projection 144 fixed to the foot pedal support for latching the foot pad in its downward, releasing position should it be desired not to use the above locking feature.

In FIG. 9, the lower end of retaining pin 122 may be formed with one or two ribs 122' receivable in one or two grooves formed on the inner surface of stop ring 130 to prevent rotation of the pin.

Many variations, modifications and other applications of the illustrated embodiments of the invention will be apparent.

I claim:

1. Accelerator and brakes control mechanism for vehicles, comprising: a foot pedal mounted for pivotable movement about a single axis extending transversely thereof, said foot pedal being pivotable in one direction about said axis to assume any one of a plurality of positions for controlling the accelerator in accordance with the position assumed, and being pivotable in the opposite direction about said axis for controlling the brakes; accelerator control means including coupling mechanism therefor connecting same to said foot pedal for controlling the vehicle accelerator in accordance with the position to which the foot pedal has been pivoted in said one direction; brake control means including coupling mechanism therefor connecting same to said foot pedal for controlling the vehicle brakes to actuate same upon pivoting the foot pedal in said opposite direction; and a retaining device actuatable by the operator for retaining the foot pedal in any of its pivoted positions to thereby fix the accelerator or brakes in accordance with the position to which the foot pedal has been pivoted about said axis in said one or opposite direction, whereby said control mechanism may be used in place of hand brakes for fixing the brakes in braking position, and also for fixing the accelerator in a predetermined vehicle-speed position.

2. Control mechanisms as defined in claim 1, wherein said retaining device comprises a fixed step element having a plurality of teeth, a retaining pin movable by said foot pedal in the first direction along said stepped element to seat between a pair of teeth at one end thereof to fix the accelerator in accordance with the position to which the foot pedal has been pivoted in said one direction, said retaining pin being movable by said foot pedal in the opposite direction along said stepped element to seat between a pair of teeth at the opposite end thereof to fix the brakes in accordance with the position to which the foot pedal has been pivoted in said opposite direction.

3. Control mechanism as defined in claim 2, further including a detent device operable by the foot pedal for indicating to the operator when the foot pedal is pivoted past its "zero" position.

4. Control mechanism as defined in claim 2, wherein said foot pedal is additionally mounted for slidable movement in a lateral direction with respect to its pivotal axis, said retaining pin being receivable in a step of said stepped element upon sliding the foot pedal in said lateral direction.

5. Control mechanism as defined in claim 4, wherein said stepped element also carries a detent member cooperable with said retaining pin during the pivoting of the foot pedal to produce an indication to the operator when the foot pedal is pivoted past its "zero" position.

6. Control mechanism as defined in claim 2, wherein said foot pedal is additionally mounted for downward pivotable movement against a spring about an axis parallel to the longitudinal axis of the foot pedal, said foot pedal being downwardly pivoted about the latter axis by the downward force of the user's foot to cause the retaining pin to disengage from the stepped element and being upwardly pivoted by said spring when the downward force of the user's foot is removed to cause the retaining pin to engage said stepped element.

7. Control mechanism as defined in claim 1, wherein said coupling mechanisms include a pair of links and a pair of bellcranks each having an arm at one end coupled by one of said links to said foot pedal so as to be pivoted therewith, the opposite arm of one bellcrank being coupled to the accelerator control means, and the opposite arm of the other bellcrank being coupled to the brake control means.

8. Control mechanism as defined in claim 1, wherein said coupling mechanisms include a single link and a pair of bellcranks each having an arm at one end coupled by said single link to said foot pedal and an arm at its opposite end, one of the latter arms being coupled to the accelerator control means and the other being coupled to the brake control means.

9. Control mechanism as defined in claim 1, wherein said pivotable foot pedal includes a foot pad slidably mounted on a pivotable foot pedal support, there being means for fixing the foot pad in position on said foot pedal support.